Figure 11:
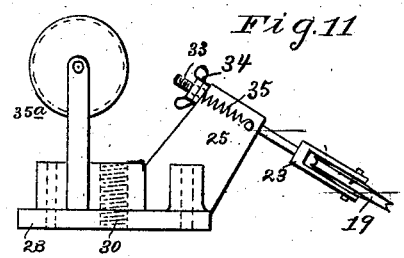

No. 847,041. PATENTED MAR. 12, 1907.
E. D. C. BAYNE & L. A. SUBERS.
AUTOMOBILE TIRE WINDING MACHINE.
APPLICATION FILED NOV. 19, 1906.
4 SHEETS—SHEET 1.
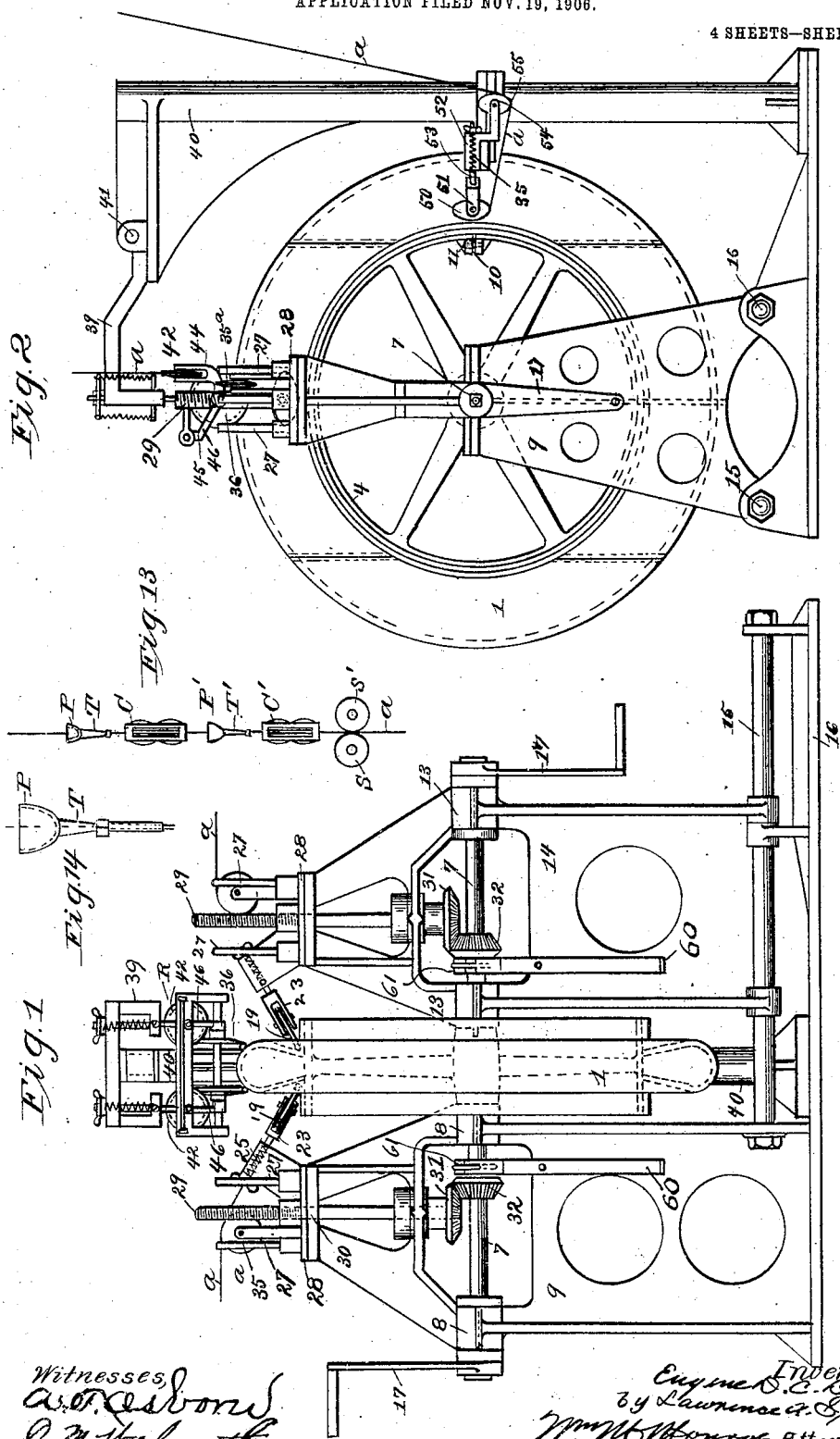

No. 847,041. PATENTED MAR. 12, 1907.
E. D. C. BAYNE & L. A. SUBERS.
AUTOMOBILE TIRE WINDING MACHINE.
APPLICATION FILED NOV. 19, 1906.
4 SHEETS—SHEET 2.
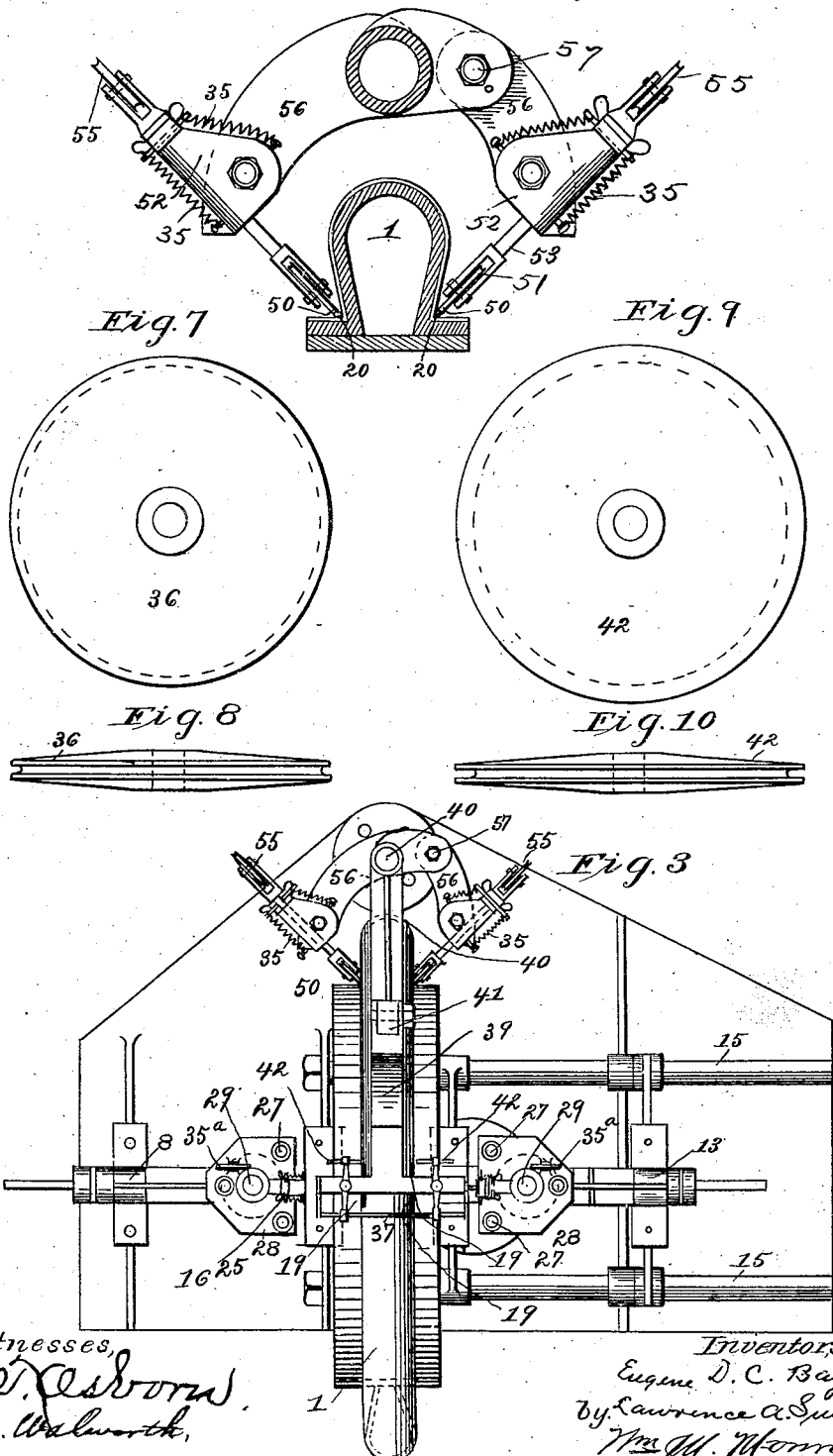

No. 847,041.  
PATENTED MAR. 12, 1907.

E. D. C. BAYNE & L. A. SUBERS.  
AUTOMOBILE TIRE WINDING MACHINE.  
APPLICATION FILED NOV. 19, 1906.

4 SHEETS—SHEET 3.

No. 847,041.  
PATENTED MAR. 12, 1907.

E. D. C. BAYNE & L. A. SUBERS.
AUTOMOBILE TIRE WINDING MACHINE.
APPLICATION FILED NOV. 19, 1906.

4 SHEETS—SHEET 4.

UNITED STATES PATENT OFFICE.

EUGENE D. C. BAYNE AND LAWRENCE A. SUBERS, OF CLEVELAND, OHIO.

AUTOMOBILE-TIRE-WINDING MACHINE.

No. 847,041. Specification of Letters Patent. Patented March 12, 1907.

Application filed November 19, 1906. Serial No. 344,094.

*To all whom it may concern:*

Be it known that we, EUGENE D. C. BAYNE and LAWRENCE A. SUBERS, citizens of the United States, and residents of Cleveland, county of Cuyahoga, State of Ohio, have invented certain new and useful Improvements in Automobile-Tire-Winding Machines, of which we hereby declare the following to be a full, clear, and exact description, such as will enable others skilled in the art to which it appertains to make and use the same.

Our invention relates to improvements in machinery for winding pneumatic-tire cases and inner tubes, and is designed to overcome the inherent difficulties in laying the thread (which enters into the composition of the tire) circumferentially therein, and thereby provide a form of tire-casing and tube therefor which will be capable of resisting all circumferential and tangential strains and have an accordingly increased efficiency and durability in use.

The invention comprises a rotatable, detachable, collapsible, and highly-polished metallic tire-frame having a cross-section similar to that of the tire and upon which the circumferentially-laid thread is wound; also instrumentalities for applying the thread closely to the wheel-surface as the tire-frame is rotated upon its axis, and automatically-operating mechanism for feeding the thread in closely-approximated rows upon the tire-frame surface, so that the several strands shall adhere together and form a uniform coating or layer thereon.

Furthermore, the machine is designed for use in winding the form of tire described in an accompanying application for a patent, in which a layer of transversely-laid thread is alternated with a layer of circumferentially-wound thread, and each thread is enveloped in a tube or solid coating of insulating and preferably vulcanizable material, which at the time of winding has an adhesive surface, so that as the threads are successively wound upon the surface of the tire-frame they will adhere together and the completed fabric or tire will form an integral or unitary structure, and when vulcanized a perfect vendible tire of heretofore unattainable strength and resistance to circumferential and transverse stresses is thus obtained.

The invention also comprises the detachable, collapsible, and highly-polished metallic tire-frame, the various instrumentalities for guiding and feeding the thread, and means for automatically adjusting the positions of the thread guiding and applying instrumentalities, and the various means for preparing and feeding the prepared thread to the machine and the combination and arrangement of the various parts and construction of details, as hereinafter described, shown in the accompanying drawings, and specifically pointed out in the claims.

Figure 12:
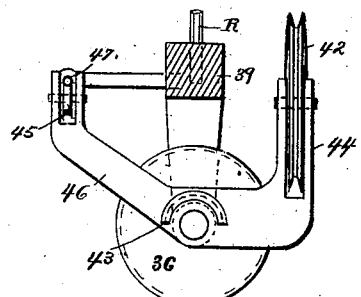
Figure 4:
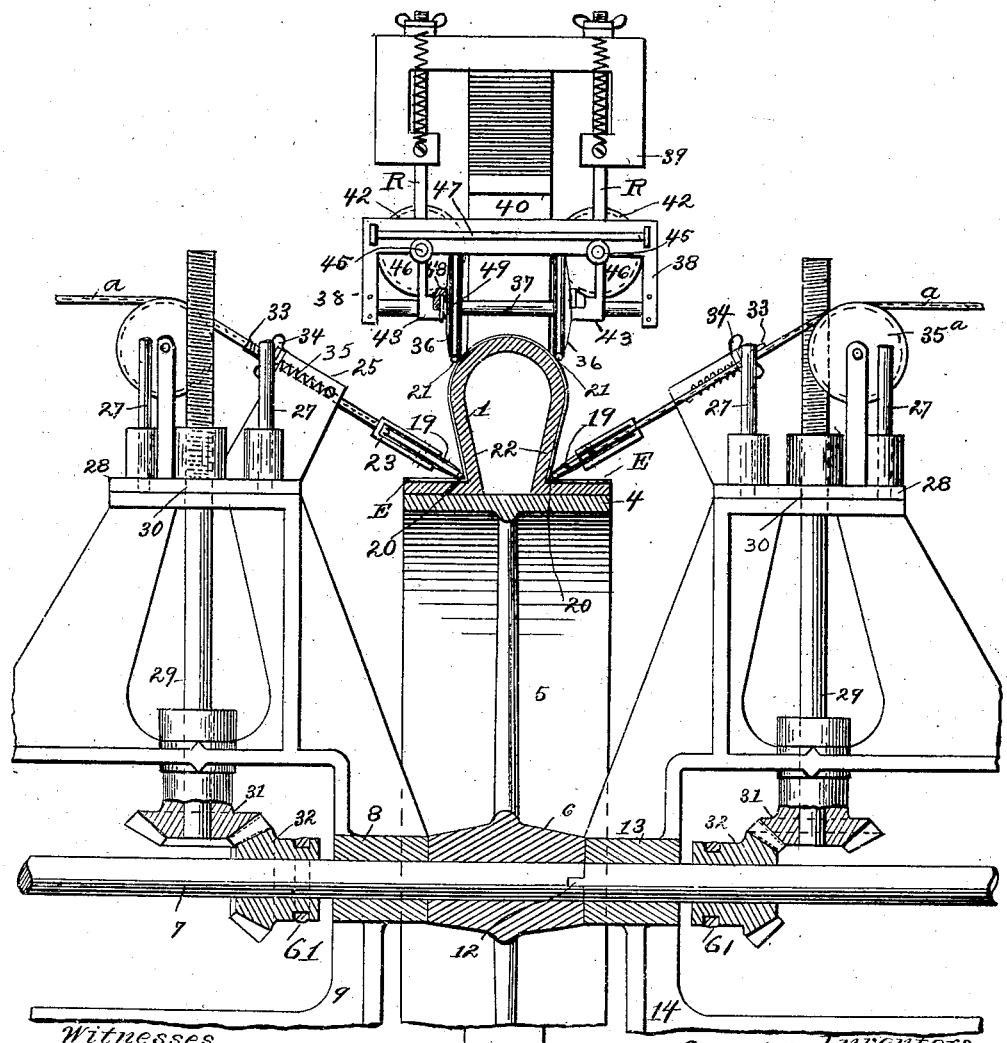
Figure 5:
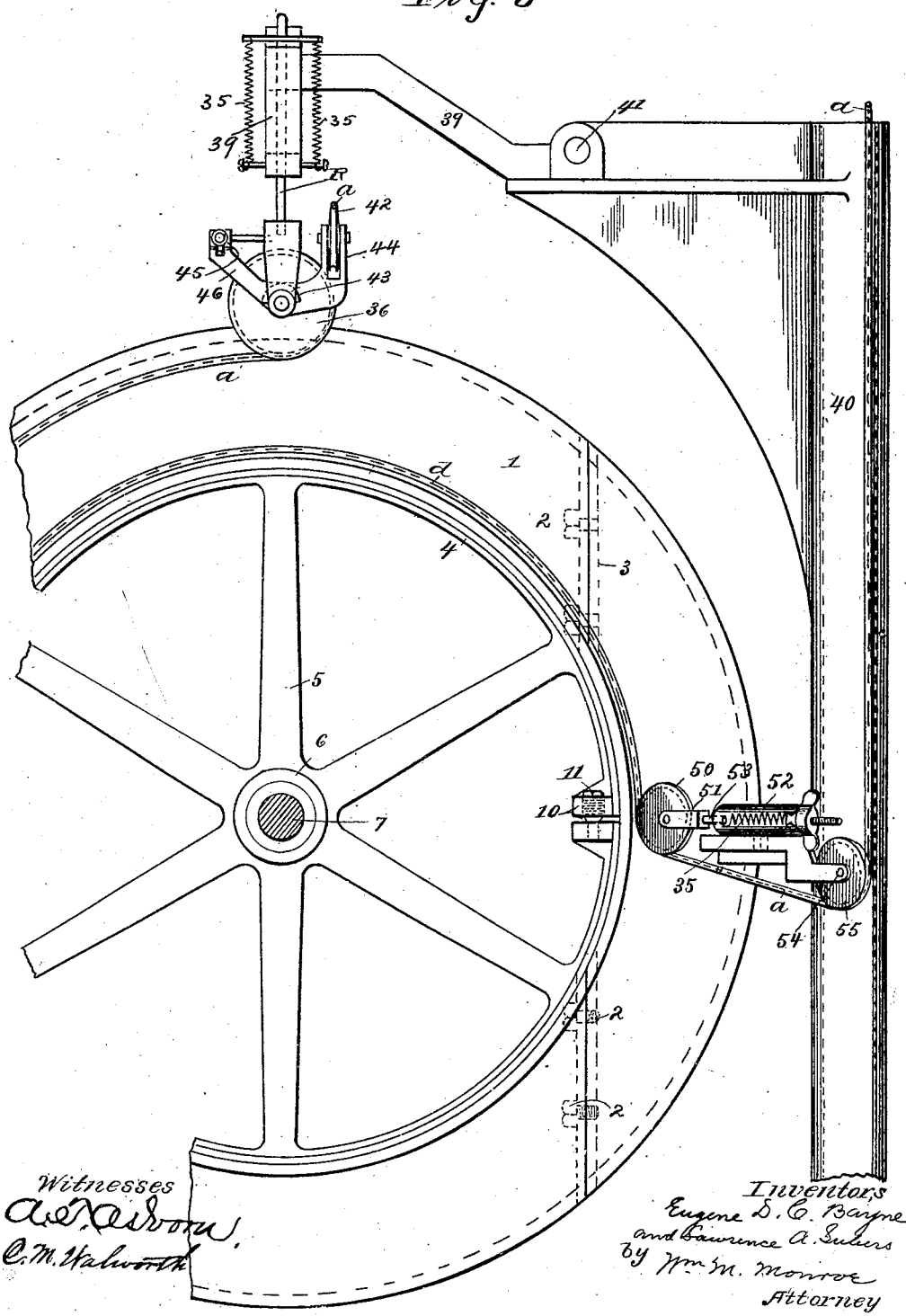

In the accompanying drawings, Figure 1 is a front elevation of the device, showing the rotatable tire-frame, its support, and the positions of the various thread-guiding and thread-applying devices and the means for preparing the thread. Fig. 2 is a side elevation thereof. Fig. 3 is a plan view thereof. Fig. 4 is an enlarged sectional view showing the upper part of Fig. 1. Fig. 5 is an enlarged view of the upper part of Fig. 2. Fig. 6 is a transverse section of tire-frame on center line, showing the thread-laying rollers or director-wheels which apply the thread to the laterally-extending flange of the tire-frame, which corresponds to the clencher portion of the tire. Figs. 7 and 8 are detail views in plan and elevation of one of the director-wheels, by means of which it is applied to its exact position upon the tire-frame. Figs. 9 and 10 are similar views of one of the thread-guiding wheels. Fig. 11 is an enlarged detail of one of the director-wheel holders, by means of which the sides of the tire are wound. Fig. 12 is a similar view of the balanced holder for the thread surface of the tire. Figs. 13 and 14 are detail views of the receptacles, draw-tubes, and air-passages through which the cord passes to the machine in its insulated form.

In the figures, 1 is a detachable, collapsible, and highly-polished metallic tire-frame upon which the threads forming the tire casing or tube are wound. This tire-frame is divisible into four sectional parts attached together by means of the bolts 2, passing through flanges 3, so that the completed tire casing or tube can readily be removed. This sectional tire-frame is mounted upon the periphery of the wheel-rim 4, which is supported by means of arms 5 and hub 6 upon a driving-shaft 7, mounted in bearings 8 on a suitable frame 9. The rim is made expansible to securely clamp the tire-frame thereon by means of the slotted opening 10 therethrough and a connecting or expanding bolt or bolts 11, by means of which the edges of the slot can be forced apart, and thus employ frictional contact under pressure to retain the tire-frame in position.

In order to make the removal of the tire-frame convenient, the shaft upon which the wheel-hub 6 is mounted is divided within the hub or adjacent thereto, as at 12, and the outer bearings 13 and frame 14 are slidably mounted upon guides, such as the rods 15, upon the common bed-plate 16, so that the outer bearings and outer portion of the shaft can be moved to permit of the removal of the tire casing or tube.

Means for rotating the tire-frame are shown, as cranks 17, upon each end of the shaft; but we do not limit ourselves to the identical forms of construction of this or other portions of the machine, since other equivalent means can be employed to obtain the desired results and lie within the spirit of the invention.

The two portions of the shaft rotate in common, and a tongue upon one portion is shown entering a groove in the other portion with this object in view.

Upon each side of the vertical center of the tire-frame are shown the director-wheels 19 19, over which the prepared insulated threads A, having a perfectly cylindrical and compressed surface, are designed to run, and which apply the threads directly to the surface of the tire-frame upon the sides thereof, commencing at the inner edge or angle 20 and build the thread A in a constantly-increasing spiral wind with the incasing insulation of each row of threads in contact until a position is reached at 21 at approximately an angle of thirty degrees to the axis of the tire-frame. These threads being incased in adhesive material immediately adhere together and to the transversely-laid layer 22 of similar thread below and retain their position without difficulty, and being of perfect shape and having a carefully-adjusted regular upward movement fit immediately into their places without possible distortion or danger of overlapping of the separate strands.

The upward movement of the winding or director wheels is automatically accomplished, and this movement and the means for obtaining such slight lateral movements under control as may be necessitated by the flaring or out of vertical shape of the tire-frame sides may be described as follows: The director-wheels are pivotally mounted within the forks 23, which pass through squared openings in the supports 25. The fork-stems are also angular, so as not to rotate in these openings. These supports are vertically movable upon guide-rods 27 27, fixed in the platforms 28 28, which are mounted upon the frame portions 9 and 14.

The supports for the director-forks and director-wheels are slowly raised to correspond to the diametrical increase in the size of the spiral winds by means of the right and left screw-threaded vertical shafts 29 29, which pass through corresponding nuts 30 in the supports, and these shafts are rotated in conjunction with the shaft by means of the connecting bevel-gears 31 and 32 and the movements are accurately proportioned and the pitch of the screw so regulated as to raise the platforms 28 28 and the director-wheels 19 19 carrying the thread upon the periphery of the tire-frame exactly one diameter of the thread at each revolution of the tire-frame.

The forks can be set to limit their inward travel by means of screw-threads 33 upon their outer ends and nuts 34 engaging their supports. Springs 35, connecting the forks and supports, force the director-wheels into constant contact with the tire-frame, so that the thread is directly applied thereon and cannot get out of position and also provide sufficient elasticity to permit of lateral movement to the required degree. Guide-wheels 35$^a$ serve to direct the thread to the director-wheels.

Clutch levers and rings 60 and 61 engage the bevel-gears 32 on the shaft 7 and throw the gears to stop the action of the right and left hand screws 29 29 as soon as the threads have been wound sufficiently high on the tire-frame to permit the winding of the crown portion thereof, and the director-wheels meet closely and the thread is moved from one to the other by hand.

As soon as the sides of the tire-frame are wound full up to the angle suggested other director-wheels 36, arranged to engage each side of the center of the crown on the tread-surface of the tire-frame, are employed to continue the winding of the threads to the diametrical central plane of the tire-frame. These wheels are mounted upon a horizontal rod 37, upon which they are free to move laterally, and this rod is mounted in a wide fork 38, which is adjustably supported for vertical movement in the head 39 by means of spring-pressed rods R. The head is attached to the standard 40 by means of a pivot 41, which enables the head and attached fork and director-wheels to be lifted while removing the tire casing or tube.

It will be seen that as one thread is laid after the other the director-wheels 36 will readily move toward each other until they completely fill the tread on the crown portion of the tire-frame—that is, the grooves in the director-wheels 36 follow the insulated threads as they are laid, and hence the wheels move toward each other as the rows of thread increase in number until the flat sides of the two director-wheels engage at the center of the crown.

Guide-wheels 42 42 are employed to guide the threads to the director-wheels, and since they must move with the director-wheels each guide-wheel is mounted in an arm 44, attached to a central hub 43, which is in turn provided with a semicircular flange and groove 48, which is engaged by an annular flange 49 upon the hub of the director-wheel, so that the director-wheel will move the guide-wheel arm as it travels. To prevent the guide-wheel from tipping, a second arm 46 is provided with a roller 45, which runs upon a horizontal rod 47, mounted upon the fork 38.

The highest path of each side-winding director-wheel and the lowest path of each crown director-wheel come so closely together that the thread will almost run from one to the other. However, the thread is placed in position in the proper guide when the exact position of transfer is attained and the machine is not necessarily stopped to permit this transfer if run slowly.

The devices for winding the thread upon the lateral extension E of the tire-frame are seen to be operated simultaneously on each side thereof and comprise director-wheels 50, pivoted in spring-controlled forks 51, which move longitudinally in supports 52 and the stems 53 are squared to prevent them from turning. Upon these supports are also rigid forks 54, in which are pivoted the guide-wheels 55, by means of which the threads are brought to the director-wheels. These supports 52 are pivoted for lateral swinging movement upon the arms 56, which are attached to the same standard which supports the director-wheels 36 36 above. One of these arms is hinged at 57 so that it can be turned away from the tire-frame when the tire casing or tube is to be removed.

The director-wheels first place the thread in the innermost angle at 20, and thence the pressure of the adjacent thread will cause the directors to lay the thread smoothly in outwardly-widening circles until the edge is reached.

Since the groove in each director-wheel 50 will follow the insulated thread as it is laid and as the rows of thread extend farther from the center of the frame, the director-wheels follow the widening circles and the springs maintain an elastic pressure of the director-wheels upon the threads. The springs 35 readily permit of this action.

An essential portion of the device is found in the instrumentalities for coating the thread with the tubular insulation, since the thread thus coated is too sticky to be wound upon spools or spindles and must come directly from the bath and formers to the tire-frame. This device is specifically represented in Figs. 13 and 14 and comprises a series of receptacles, such as P and P', filled with a solution of insulating material, such as rubber, through which the thread passes. Each receptacle is provided with a vertically-extending tube T, preferably of funnel shape, through which the thread passes. The tubes are graduated in size, and after the thread has received its first coating in the upper tube it passes through a box or conduit C, through which a drying-current of air passes, and when thoroughly dried the thread passes through the lower receptacle P' and through second tube T' of slightly larger diameter than the first tubes T, which increase the thickness of the coating materially. A second drying-current of air is passed through the conduit C, then dries the coating thoroughly, although the sticky surface is still retained. The tubular coating upon the thread is then molded and compressed into a perfect cylindrical form while still plastic and by means of rollers S and S', which are designed to draw the thread centrally through the tubes at a speed equaling the speed of the machine, so that the thread will not be under any undue tension when applied to the tire-frame. In this manner a perfect tire-casing or tube can be wound with circumferential and transverse layers of thread, which are not at any time in direct contact, and hence have no frictional bearing upon each other. The layers of transverse thread can be introduced at any time most convenient in the course of the winding. The transverse layers of thread can be introduced by hand upon the tire-frame in the path of the winders, so that one continuous action will wind the complete wheel.

We believe ourselves to be the first to wind a pneumatic tire-case and inner tube with threads in a circumferential manner by means of a collapsible circular frame and automatically-operating mechanism adapted to apply the thread thereto and also to apply a thread having a tenacious surface thereto or to a tenacious coating thereon under elastic pressure. It will be observed that while the springs upon the director-guides serve to permit of lateral and vertical movement under control of the threads they also provide a continuous pressure thereto, which forces the threads into their exact position relative to each other and assists in producing a regular and even wind, as well as compelling the threads into a more intimate contact, so that their contacting surfaces will adhere closely together.

Having described our invention, what we claim as new, and desire to secure by Letters Patent, is—

1. In a machine for circumferentially winding insulated thread to form a tire-casing or tube, a circular frame separable into component portions, a rotatable support to which the tire-frame is detachably secured at its inner edge, a shaft on which said rotatable support is secured, and means for rotating the shaft, substantially as described.

2. In a machine for the purpose described, a rotatable tire-frame, said tire-frame being divisible in sections, a rotatable support upon which said tire-frame is mounted, said tire-frame being detachable from said support, a shaft having a separable portion upon which said support and tire-frame are mounted, and bearings for each portion of said shaft, the bearings for said separable portion of said shaft being movable toward and from said tire-frame and support, substantially as described.

3. In a machine for the purpose described, an annular rotatable tire-frame formed in separable portions, a rotatable support therefor to which the tire-frame is detachably secured at its inner edge, a shaft on which said tire-frame and support are mounted, means for rotating said shaft and instrumentalities for applying a thread insulated with adhesive material to all parts of the surface of said tire-frame, as said tire-frame rotates whereby said insulated thread is wound circumferentially thereon, substantially as described.

4. The combination with a rotatable collapsible tire-frame and a pivotal support therefor, of means for rotating said tire-frame and instrumentalities for applying threads insulated with an adhesive substance simultaneously to the crown and side surfaces of said tire-frame as said tire-frame rotates, whereby said insulated threads are circumferentially wound thereon, substantially as described.

5. The combination with a rotatable tire-frame having sides and tread and lateral surfaces and a pivot-support therefor, of means for rotating said tire-frame, instrumentalities for applying thread insulated with adhesive material directly to the sides of said tire-frame, instrumentalities for applying similar insulated thread to the tread portion thereof, and instrumentalities for applying thread similarly treated to the lateral surfaces thereof, whereby a unitary surface is produced, substantially as described.

6. In a machine for the purpose described, the combination with a separable rotatable tire-frame, of a rotatable wheel having an expansible rim upon which said tire-frame is mounted, a supporting-shaft therefor interlocking extremities for said shaft, fixed bearings for one portion of said shaft and movable bearings for the other portion of said shaft and means for rotating said shaft and tire-frame and tire-frame support, substantially as described.

7. The combination with a rotatable tire-frame, having side, tread and lateral surfaces adapted to receive circumferentially-wound insulated threads, and a pivotal support therefor of means for rotating said tire-frame, director-wheels positioned and arranged upon each side of said tire-frame, by means of which insulated thread is applied to the aforesaid surfaces of said tire-frame, and instrumentalities for obtaining lateral and vertical movements for the director-wheels, substantially as described.

8. The combination with a rotatable tire-frame on which circumferentially-laid insulated threads can be wound and means for rotating the same, of director-wheels over which the insulated threads are applied to the tire-frame, supports for said wheels, means for supplying said wheels with elastic pressure and guide-wheels on said supports adapted to lead the insulated threads to said director-wheels, substantially as described.

9. In combination with a rotatable tire-frame having tread and side and lateral surfaces, and a pivotal support therefor of means for rotating the tire-frame, grooved spring-pressed directors adapted to apply the insulated thread to the aforesaid surfaces, supports for said directors, and means for giving a radial movement to the directors which apply the insulated thread to the sides of the tire-frame, said movement controlled by the said means for rotating said tire-frame, substantially as described.

10. In combination in a machine for the purpose set forth, a rotatable tire-frame having a crown, sides and lateral extensions, a shaft and rimmed wheel on which the tire-frame is mounted, spring-pressed director-wheels in engagement respectively with the crown, sides and lateral extensions of said tire-frame, and arranged to apply an insulated thread directly thereto in a circumferential wind and automatically-operating mechanism for radially moving the side-winding director-wheels to correspond to the increasing diameter of the wind, substantially as described.

11. In combination in a machine for the purpose set forth, a rotatable tire-frame having a crown and side portions, an operating-shaft therefor, director-wheels and supports therefor adjacent to said tire-frame and on both sides thereof, adapted and arranged to engage the respective surfaces of crown and side portions, the supports for the director-wheels for the side portions having screw-threaded openings, screw-threaded shafts passing through said screw-threaded openings in said supports, and a geared connection between said screw-threaded shafts and the said operating-shaft, substantially as described.

12. In combination, in a machine for winding insulated threads circumferentially to form a tire-casing or tube, a rotatable and separable tire-frame having crown, side and laterally-extending portions, a rimmed wheel on which the tire-frame is mounted, a divided shaft therefor, bearings for said wheel, a bed-plate upon which said bearings are mounted, one set of said bearings being movable thereon, a pair of director-wheels for said thread adapted to engage the crown portion of said tire-frame and to move together as said cord is laid, a pair of director-wheels adapted to engage the side portions of said tire-frame and move diametrically outward as the thread is wound, a common support for the said crown-engaging wheels, said support mounted on said bed-plate, supports for said side-engaging wheels, said supports mounted in guides for radial movement relatively to said tire-frame, and having screw-threaded openings therein, and screw-threaded shafts passing through said openings and geared connections for said shafts and divided shafts, substantially as described.

13. A support for a pair of director-guides for the purpose set forth, consisting of a standard, an arm pivoted thereon, vertical rods spring-pressed and arranged for vertical movement in said arm, a fork to which the lower ends of said rods are secured, a horizontal rod in said fork, upon which said director-wheels are loosely mounted, a semicircular hub for each wheel, in which said wheel rotates said hub having arms a guide-wheel in one of said arms, and a roller in the other, and a horizontal rod on said fork, on which said roller runs, substantially as described.

14. In combination with director-wheels, adapted to wind the crown-surface of a tire-case or tube, a horizontal rod on which said wheels are mounted, a support for said rod, an arm to which said support is adjustably secured for vertical movement, a guide-wheel for each director-wheel, said guide-wheels being arranged to move in unison with said director-wheels, substantially as described.

15. The combination with a collapsible and rotatable tire-frame, formed in detachable portions, having a coating of tenacious fabric thereon, of automatically-acting instrumentalities for applying a circumferential wind of thread thereon under elastic pressure.

16. The combination with a collapsible and rotatable tire-frame, of a rotating device for applying a circumferential wind of thread having a tenacious surface thereupon under elastic pressure.

17. The combination with a collapsible annular tire-frame, formed in detachable portions, of an expansible wheel-rim upon which said frame is detachably secured, and means for rotating said wheel, substantially as described.

In testimony whereof we herewith set our hands this 17th day of November, 1906.

EUGENE D. C. BAYNE.
LAWRENCE A. SUBERS.

Witnesses:
A. T. OSBORN,
C. M. WOLWORTH.